United States Patent [19]

Hirt et al.

[11] Patent Number: 4,575,335

[45] Date of Patent: Mar. 11, 1986

[54] APPARATUS AND METHOD FOR HEATING AN AIR STREAM FLOWING THROUGH A CONDUIT

[75] Inventors: Thomas J. Hirt; Merlin H. Moseman, both of Omaha, Nebr.

[73] Assignee: InterNorth, Inc., Omaha, Nebr.

[21] Appl. No.: 677,592

[22] Filed: Dec. 3, 1984

[51] Int. Cl.$^4$ ............................ F24H 7/00; F24H 1/00
[52] U.S. Cl. ........................................ 432/29; 432/222
[58] Field of Search .................................. 432/29, 222

[56] References Cited

U.S. PATENT DOCUMENTS

| | | | |
|---|---|---|---|
| 2,983,500 | 5/1961 | Finley et al. | 432/36 |
| 3,210,059 | 10/1965 | Nesbitt et al. | 432/222 |
| 3,405,921 | 10/1968 | Rohrs | 432/222 |
| 3,779,230 | 12/1973 | Muckelrath | 432/222 |
| 3,881,863 | 5/1975 | Creuz | 432/222 |
| 4,023,923 | 5/1977 | Kramer | 432/222 |
| 4,318,392 | 3/1982 | Schreiber et al. | 126/110 R |
| 4,345,387 | 8/1982 | Stanton | 432/222 |
| 4,369,030 | 1/1983 | Siccardi | 432/37 |
| 4,383,824 | 5/1983 | Findlay et al. | 432/222 |
| 4,492,563 | 1/1985 | Reinhold | 432/222 |

Primary Examiner—John J. Camby
Attorney, Agent, or Firm—Donald F. Haas

[57] ABSTRACT

An apparatus and method are provided for heating an air stream flowing through a conduit which minimizes the introduction of noxious burner exhaust emissions into the air stream. The apparatus utilizes a refractory radiant-type burner disposed within the air stream which includes means for supplying a combustible fuel to the burner and means for igniting the combustible fuel within the burner. The apparatus also includes means for removing the hot products of combustion from the burner and venting these products to the outside atmosphere until the temperature of the burner reaches steady state operating conditions. When steady state operating conditions are reached, a damper means on the burner opens and directs the products of combustion into the air stream to heat the air stream. When the burner is turned off, the damper means closes and directs the products of combustion to the outside atmosphere.

7 Claims, 1 Drawing Figure

APPARATUS AND METHOD FOR HEATING AN AIR STREAM FLOWING THROUGH A CONDUIT

BACKGROUND OF THE INVENTION

The present invention relates to an apparatus and method for heating air streams using a refractory radiant-type burner disposed within the air stream. More particularly, the invention relates to such an apparatus and method which minimizes the introduction of noxious burner exhaust emissions into the air stream so that it may be safely used for space heating.

The commonly used forced air furnace systems, while being reasonably efficient for heating multiple room structures, have the disadvantage that they are unable to provide specific space heating for individual rooms. Individual room heat control is important for energy conservation and also to allow the occupant of the room to adjust the temperature to individual taste. In the past, there have been many attempts to provide such individual space heating capability. For the most part, these attempts have involved the use of an additional heating system for each room.

Refractory radiant-type burners have long been suggested for use in forced air heating systems for space heating of buildings and other structures. The operation of such catalytic heaters is well known, for example, as disclosed in U.S. Pat. Nos. 4,318,392, 3,199,505, 3,240,256, 3,421,826, and 3,441,359. One disadvantage of such burners for space heating is that during burner start-up, there is the potential for increased emission levels of noxious burner exhaust elements. Once these burners reach their steady state operating temperature, the production of noxious emissions is greatly reduced.

It is an object of the present invention to provide individual room space heating capability while utilizing the forced air blower system of the central furnace system for the overall structure. It is also an object of the present invention to provide an apparatus for heating an air stream flowing through a conduit, such as the duct system of a forced air furnace system, wherein the apparatus forms a part of the conduit. It is a further object of the present invention to provide a method for heating such air streams which minimizes the introduction of noxious burner exhaust emissions into the air stream.

SUMMARY OF THE INVENTION

This invention relates to an apparatus for heating an air stream flowing through a conduit wherein the apparatus forms a part of the conduit. The apparatus comprises a housing, a refractory radiant-type burner disposed within the housing, means for supplying a combustible gas to the burner, means for igniting the combustible gas, means for removing the hot products of combustion from the burner and venting them to the outside atmosphere, damper means on the burner, and means, preferably thermally or timer actuated, for controlling and changing the position of the damper means. When the damper means is fully closed, the products of the combustion are directed to the outside atmosphere through the means for removing the products. When the damper means is fully open, the products of combustion are directed into the air stream to heat it. Obviously then, when the damper means is partially open, a portion of the products are directed to the air stream and a portion are removed to the atmosphere.

The present invention also relates to a method for heating an air stream flowing through a conduit which minimizes the introduction of noxious burner exhaust emissions into the air stream. The method comprises igniting a combustible gas in a refractory radiant-type burner disposed within the air stream, venting the hot products of combustion to the outside atmosphere, monitoring the burner or exhaust gas temperature, allowing the products of combustion to flow into the air stream to heat it when the temperature rises above a specified safe level, and venting the products of combustion to the outside atmosphere when the temperature falls below the safe level or rises above a second specified safe level.

DETAILED DESCRIPTION OF THE INVENTION

Figure 1:
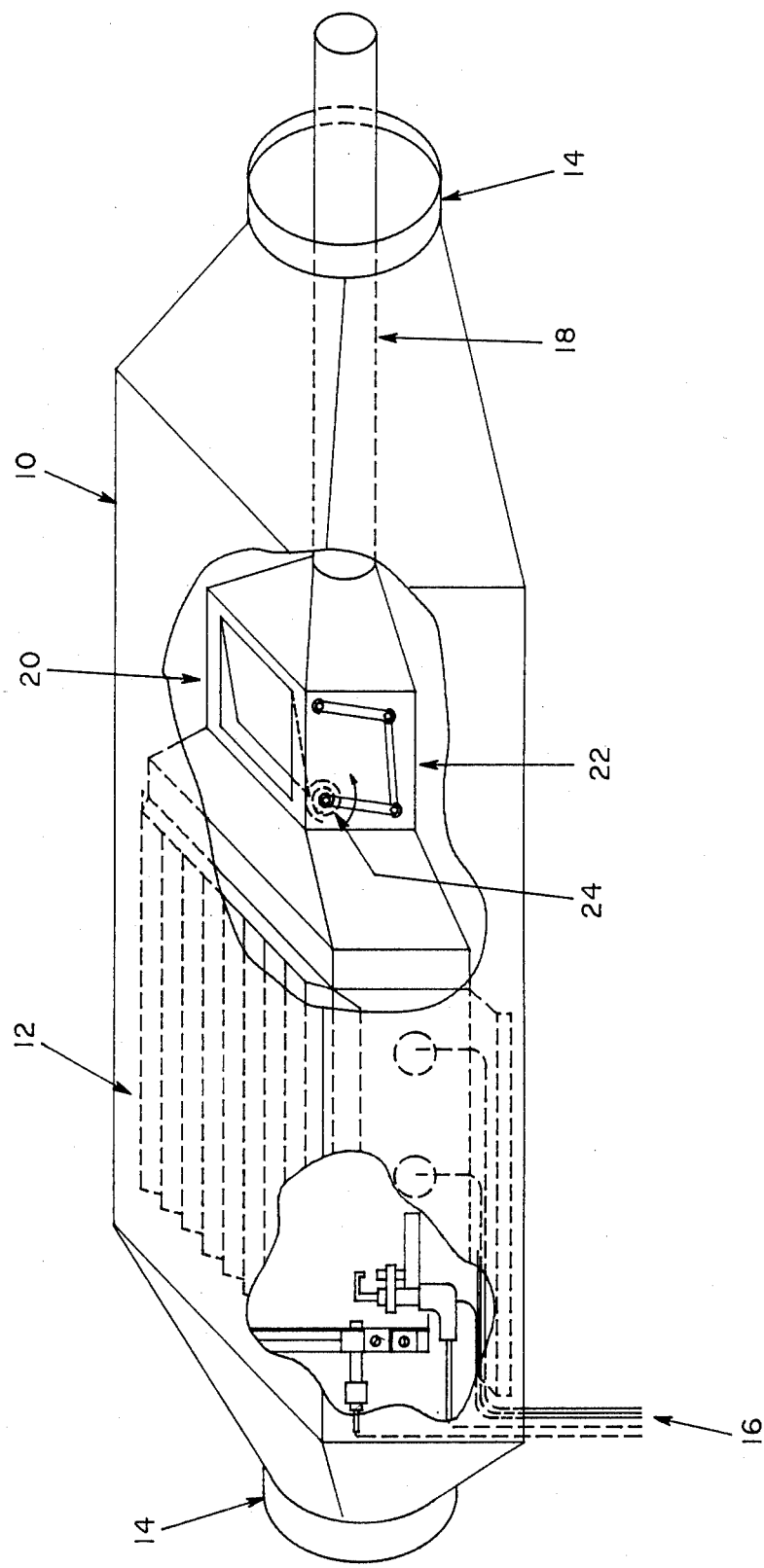
FIG. 1 is a perspective view of the apparatus with the walls of the housing shown in transparent form so that the burner inside can be illustrated.

The heating apparatus of the present invention incorporates a new design concept which is applicable for all applications in which the heating of an air stream flowing through a conduit is necessary. However, the apparatus of the present invention is especially suitable for the heating of individual rooms in multiple room structures such as residences and small office buildings. The apparatus is installed in the forced air duct system of the multiple room structure. This allows heat input directly to the circulating air in the duct system before it enters the particular space to be heated. The apparatus can be installed in the inlet end of the duct system for one or more rooms within the structure, thus allowing heat input to the ducts supplying specific rooms rather than distributing the warm air throughout the whole structure as a central furnace does. This type of individual or zone heating has the advantages of energy savings because there is no necessity to heat rooms which are not being used and flexibility in heating comfort to accommodate the different tastes of users of the different rooms.

The apparatus employs a refractory radiant-type burner to provide the heat for heating the air flowing through the ducts. Such burners generally work on the principle of surface combustion of a premixed air-fuel gas input. A portion of the energy released during the combustion process is transferred directly to the air stream adjacent to the burner while the remainder leaves the burner surface as radiant energy. Such burners are described in a variety of U.S. Pat. Nos. including 4,318,392, 3,199,505, 3,240,256, 3,421,826, and 3,441,359.

Referring to FIG. 1, the apparatus comprises a housing 10 within which is disposed of a refractory radiant-type burner 12. The housing 10 is open at each end thereof to allow air flow therethrough. Adapters 14 are provided at the open ends of the housing 10 so that the apparatus can be easily inserted in the duct of the structure to be heated. Fuel inlet lines 16 extend in through the wall of the housing 10 to the burner 12. At one end of the burner 12 there is a vent 18 through which the products of combustion from the burner are vented to the atmosphere. Vent 18 extends through adapter 14 into the duct and through an exterior wall thereof to the atmosphere. Damper 20 is used to direct the products of combustion from the burner 12 either through vent 18 or into the open area of the housing 10 and into the forced air system of the structure. Damper 20 is controlled and moved by thermally actuated operator 22 which operates at a predetermined design temperature as measured by thermostat 24.

The apparatus is inserted into the existing duct system of a structure and the forced air system of the structure is electrically connected to this apparatus so that air is circulating throughout the structure when the burner 12 is on even though the central furnace is not turned on. Obviously, if the forced air system is not in operation, the products of combustion from burner 12 cannot be circulated through the forced air system to provide space heating.

In operation, fuel flows through fuel inlet lines 16 to burner 12 where it is ignited. The damper 20 is in the closed position at this time so the products of combustion flow through vent 18 to the outside atmosphere. Thermally actuated operator 22 is designed and adjusted to open or close damper 20 when exposed to a predetermined burner or exhaust temperature. When damper 20 is opened, vent 18 is completely closed off. This allows the hot products of combustion to flow into the open area of the housing 10 to heat the air stream flowing therethrough. When the burner 12 ceases to operate, either by virtue of being turned off or otherwise, and the temperature of the burner drops below the specified safe level as measured by the thermostat 24, the operator 22 operates to close damper 20 so that all remaining products of combustion will pass through vent 18 to the atmosphere.

The apparatus can also be operated with a timer used in place of a thermally actuated control means. Referring to FIG. 1, timer 24 turns on when the burner turns on and after a specified period of time which is chosen to correspond to the time when the burner reaches its steady state condition, the timer 24 will operate operator 22 to open damper 20. When the burner is turned off, timer 24 will cause operator 22 to operate to close damper 20. The timer can be replaced by some other device which controls the damper based upon some other operating parameter. Other methods for controlling the damper 20 can also be used.

The structure to be heated will undoubtedly have a central thermostat for the central furnace. The control of the apparatus of the present invention is provided through the use of a separate thermostat installed in the room to be heated. This thermostat will be connected to the blower system of the central furnace so that the blower can be operated independently of the furnace itself. This apparatus may also be used in conjunction with a blower system which is separate from the central blower system of the structure to be heated. Thus, each room heater could be provided with its own blower system if it is desired. In order to maintain safe operation, a variety of safety features can be employed. The use of an oxygen depletion sensor to monitor the combustion zone to prevent burner use at reduced oxygen levels is contemplated herein. Also, strategically located thermal sensors can be placed in the burner housing to prevent overheating thereof.

We claim:

1. An apparatus for heating an air stream flowing through a conduit, said apparatus forming a part of said conduit and comprising:
    (a) a housing having an inlet and an outlet to allow the passage of air from said conduit therethrough,
    (b) a refractory radiant-type burner disposed within said housing,
    (c) means for supplying a combustible fuel to said burner,
    (d) means for igniting said combustible fuel,
    (e) means for removing the hot products of combustion from said burner and venting said products to the outside atmosphere,
    (f) damper means on said burner which when fully closed directs said products of combustion to said means for removing said products and when fully opened directs said products into said air stream to heat said air stream, and
    (g) means for controlling and changing the position of said damper means.

2. The appartus of claim 1 wherein the means of section (g) includes temperature measurement means which determines when the position of said damper means is changed.

3. The apparatus of claim 1 wherein the means of section (g) includes timer means which determines when the position of said damper means is changed.

4. The apparatus of claim 1 wherein the inlet and outlet of the housing are adapted to allow the apparatus to be inserted in the air stream conduit.

5. A method for heating an air stream flowing through a conduit which minimizes the introduction of noxious burner exhaust emissions into said air stream, which comprises:
    (a) igniting a combustible fuel in a refractory radiant-type burner disposed within said air stream,
    (b) venting the hot products of combustion to the outside atomosphere,
    (c) monitoring the temperature,
    (d) allowing said products to flow into said air stream to heat said air stream when said temperature rises above a specified safe level, and
    (e) venting said products to the outside atmosphere when said temperature falls below said specified safe level or rises above a second specified safe level.

6. A method for heating an air stream flowing through a conduit which minimizes the introduction of noxious burner exhaust emissions into said air stream, which comprises:
    (a) igniting a combustible fuel in a refractory radiant-type burner disposed within said air stream,
    (b) venting the hot products of combustion to the outside atomosphere,
    (c) allowing said products to flow into said air stream to heat said air stream when a specified operating parameter is attained, and
    (d) venting said products to the outside atmosphere when said burner shuts off.

7. The method of claim 6 wherein said operating parameter is time.

* * * * *